April 1, 1930.   P. R. HAHNEMANN   1,752,843
CLUTCH
Filed Oct. 5, 1928   2 Sheets-Sheet 2
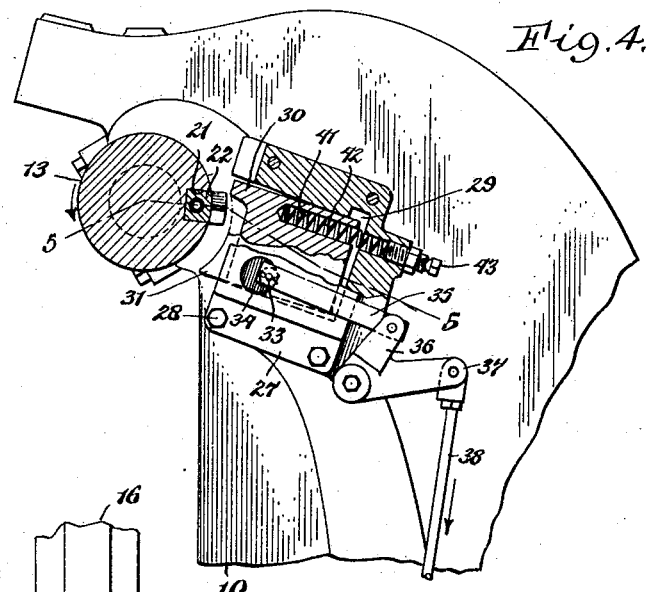
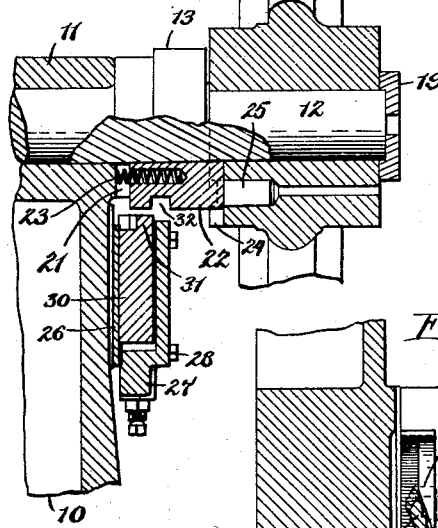
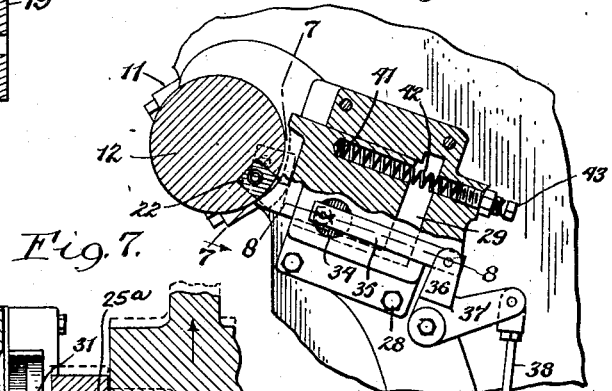
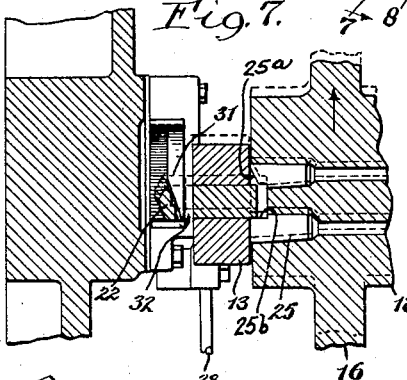
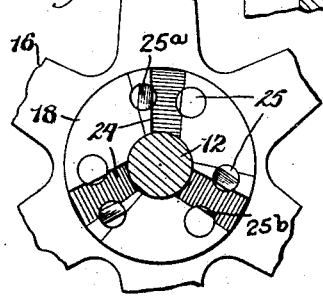
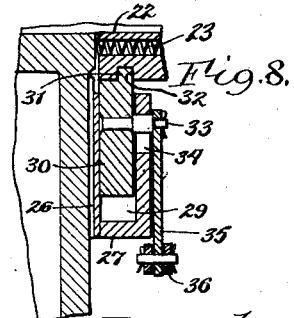
Inventor
Paul R. Hahnemann
by Popper Powers
Attorneys Patented Apr. 1, 1930

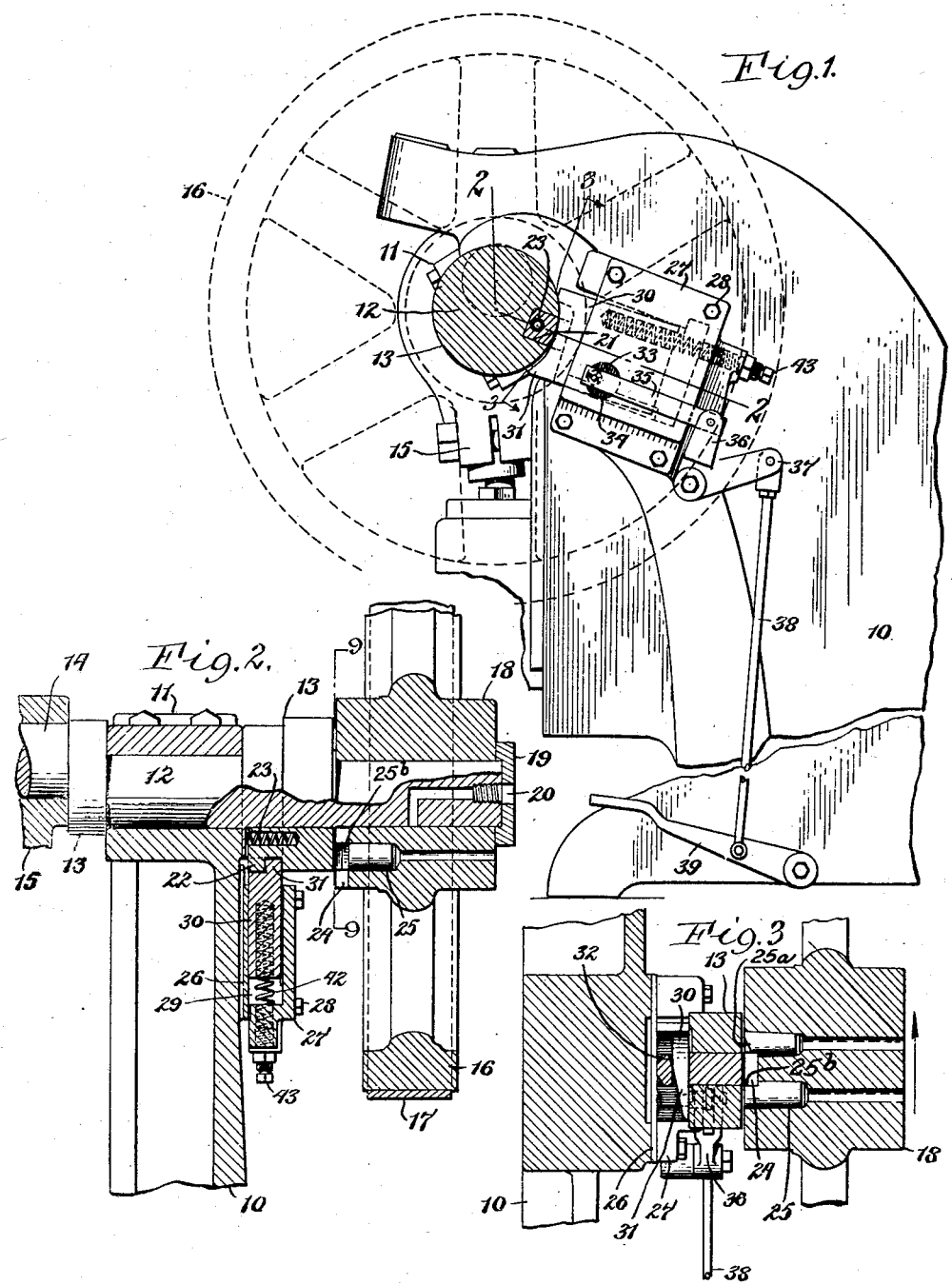

1,752,843

UNITED STATES PATENT OFFICE

PAUL R. HAHNEMANN, OF BUFFALO, NEW YORK, ASSIGNOR TO NIAGARA MACHINE AND TOOL WORKS, OF BUFFALO, NEW YORK, A CORPORATION OF NEW YORK

CLUTCH

Application filed October 5, 1928. Serial No. 310,565.

This invention relates to a clutch and more particularly to a clutch which is adapted for use in connection with machinery for permitting the operator to start the machine at will in operating on the articles which the machine is designed to produce.

One of the principal objects of this invention is to provide such a clutch which instantly and reliably effects or releases the driving connection between the driving and driven elements of the machine at the will of the operator and in which both operations are effected with little effort on the part of the operator.

A further aim is to provide such a clutch which is entirely silent when in either its operative or inoperative positions and in particular is free from the click and the consequent wear which is usually present in clutches of this type when in neutral due to an incomplete disengagement of the clutch elements.

Another aim is to reduce the number of parts and particularly the number of springs employed in the clutch and to provide a clutch which is inexpensive to construct and at the same time is durable and will stand up under severe and constant use.

In the accompanying drawings:

Figure 1 is a fragmentary vertical section through the driving shaft of a machine showing a clutch embodying my invention in elevation.

Figure 2 is a sectional view of the clutch and the associated parts taken on line 2—2, Fig. 1 and showing the clutch in its neutral or inoperative position.

Figure 3 is a vertical section taken on line 3—3, Fig. 1, and showing the clutch in neutral or inoperative position.

Figure 4 is a vertical section similar to Fig. 1 showing a portion of the clutch broken away and showing the clutch in its operative position.

Figure 5 is a horizontal section taken on line 5—5, Fig. 4, and showing the clutch in its operative position.

Figure 6 is a view similar to Figs. 1 and 4 and showing the position of the parts near the end of the releasing operation.

Figure 7 is a section taken on line 7—7, Fig. 6, and showing the position of the parts near the end of the releasing operation.

Figure 8 is a section taken on line 8—8, Fig. 6.

Figure 9 is an end view of the driving member.

Similar reference numerals refer to similar parts in each of the several views.

In its general organization the present clutch includes a spring loaded pin which is carried by the driven member of the machine and is movable into and out of coupling relation with the driving member thereof, a cam plate loosely guided for movement toward and from the pin and adapted to engage the same and effect its retraction from the driving members, and spring means reacting on the cam plate and so arranged that during the withdrawal of the pin from coupling relation the plate is moved to compress the spring and upon completion of this withdrawing movement the spring reacts to move said cam plate and effect a further retraction of the pin from the driving member thereby insuring a clearance between the pin and driving member and preventing the usual noise and wear due to inoperative contact between these parts.

The machine in connection with which the present clutch is intended to be used includes a frame 10 which is formed to provide a bearing 11 in which the driven shaft or member 12 is journaled as best shown in Fig. 2. On opposite sides of the supporting bearing 11, the driven shaft 12 is formed to provide collars 13 which prevent its lateral displacement. In the machine shown, one end of the driven shaft 12 is formed to provide a crank pin 14 which reciprocates a member 15 for operation on the work in connection with which the machine is intended to be used. On the opposite end of the driven shaft 12, a driving pulley 16 is loosely mounted and continuously turned by a belt 17 or in any other suitable manner. This pulley has the usual hub 18 and is held on the driven shaft by a cap 19 and oil for its bearing on the driven shaft 12 is supplied through a passage 20 in the driven shaft.

As best shown in Figs. 1 and 2, the collar or head 13 provided on the driven shaft 12 adjacent the driving pulley 16 is grooved to provide a longitudinal slideway 21 which receives a coupling pin 22, the outer side of which is preferably curved to conform to the shape of the head 13. A pocket is drilled in the inner end of this pin and in this pocket is arranged a small helical compression spring 23 which bears against the end of the slideway and urges the pin 22 outwardly and into engagement with the hub 18 of the driving pulley. The hub 18 of the pulley, as best shown in Fig. 9, is provided with a plurality of radial slots 24 on the side adjacent the pin 22, and when released, the pin is urged into one of these slots by its spring 23 and thereby establishes a driving connection between the driving pulley and the driven shaft until the pin 22 is withdrawn. To take the wear, a pair of hardened pins 25 are set into the hub of the driving pulley on opposite sides of each of the radial slots 24.

These pins 25 are preferably made of hardened steel or the like and project into the slots 24 so that the coupling pin 22, when released, engages these pins instead of the sides of the slots 24 which are comparatively soft. The edge of each slot 24 is beveled on that side over which the coupling pin 22 rides before entering the slot and the hardened wear pins 25 on that side of each slot are similarly provided with an inclined or beveled face 25$^a$ over which the coupling pin 22 rides and is eased into the slot. On the opposite side of each slot 24, the wear pins 25 are each provided with a flat face 25$^b$ which forms an abrupt shoulder for engaging the coupling pin 22 to provide a driving shoulder therefor. By this means, the coupling pin 22 rides over the end of the hub 18 and the end of one of the wear pins 25. The coupling pin being urged outwardly by its spring 23 thereupon rides down the inclined face 25$^a$ of the wear pin of the first slot encountered and engages the abrupt face 25$^b$ of the wear pin 25 on the opposite side of this slot whereby a driving connection is established between the driving and driven members until the coupling pin 22 is withdrawn.

Adjacent the driven shaft 12, a casing is mounted on the machine frame and includes a flat rear plate 26 and a cover 27, the casing being secured by bolts 28 which extend through to the machine frame. As best shown in Figs. 2 and 4, the cover section 27 is formed to provide a rectangular pocket 29 which is open at the end adjacent the driven shaft 12. In this pocket is loosely arranged an oblong cam plate 30 which is preferably recessed at its outer end to conform to the curvature of the head or collar 13 on the driven shaft and at this end is formed to provide a throwout cam 31. In register with the leading edge of this throwout cam 31, the coupling pin 22 is provided with a recess 32 and it therefore follows that when the cam plate 30 is moved toward the driven shaft that the leading end of its cam 31 enters the groove 32 of the rotating coupling pin, the pin rides up on the cam 31 and is moved inwardly against the resistance of its spring and out of engagement with the radial grooves or slots 24 in the hub of the driving pulley. The movement of the driven shaft 12 is therefore stopped until the cam plate 30 is withdrawn to permit the coupling pin to spring back into engagement with the driving pulley hub and establish a driving connection.

On the lower side of the cam plate 30, a pin 33 is mounted, which pin projects laterally outward from the cam plate and through an opening 34 in the casing cover 27. This opening 34, as best shown in Fig. 8, limits both the inward and outward movement of the cam plate 30 by forming a stop for its pin 33. To the outer end of this pin is pivotally secured a bar or link 35 the other end of which is pivotally secured between the bifurcated arm 36 of a bell crank lever. This bell crank lever is mounted on the machine frame and its other arm 37 is secured to a vertical shipper rod 38. The lower end of this shipper rod is connected to a foot treadle 39 between its tread and its pivotal connection with the machine frame, and this treadle is normally held in its elevated position by a spring 42 as hereinafter described.

It is apparent that when the operator steps on the treadle 39, the bell crank lever will be rocked downwardly and rearwardly and the cam plate 30 will be drawn rearwardly thereby disengaging its cam from the pin and permitting the coupling pin 22 to be moved into coupling engagement with the driving pulley under the influence of its spring. This position of the parts is indicated in Figs. 4 and 5. Upon releasing the treadle, a reverse motion of the parts is caused by the spring 42 and the cam plate is moved into engagement with the coupling pin 22 and the rotating coupling pin rides up on the cam 31 and is withdrawn rearwardly.

In the absence of provision to prevent it, the movement of the driven shaft 12 and the retracting movement of the coupling pin 22 stops the instant that the driving connection between the coupling pin and the driving pulley or its wear pin is broken. This, while sufficient to break the driving connection, is not sufficient to break all contact between the coupling pin and the driving pulley and consequently the coupling pin still contacts with the wear pins in the hub of the driving pulley and produces an undesirable clicking noise as the pin traverses the wear pins and face of the hub. To eliminate this clicking noise and also to avoid the resultant wear on both the coupling pin and the hardened pins on the hub while the clutch is in neutral, the present invention provides for a secondary retraction of the pin after the driving connection has been broken, which moves the coupling pin completely out of the influence of the driving pulley and eliminates noise and wear on the parts when the clutch is in neutral. For this purpose, the pocket 29 in the outer casing section 27 which receives the cam or throwout plate 30 is wider than the plate 30 so that the cam plate has a limited lateral play therein about its pivotal connection with the bar or link 35 as an axis. On the side opposite to this pivotal connection, a recess 41 is drilled into the cam plate 30 and this recess receives a compression spring 42. The rear end of this spring bears against the end of an adjustment screw 43 which is arranged at the rear end of the casing section 27.

This adjusting screw 43 is screwed into a recess in the outer end of the casing cover 27 where its forms an abutment for the end of the spring 42 so that upon removing the adjusting screw, the spring 42 can be removed through the open end of the slot 41 and a new spring substituted should this become necessary. The adjusting screw is held in its adjusted position by means of a lock nut as best shown in Fig. 6, or in any other suitable manner.

It is apparent that the tendency of this spring is to throw the upper end of the cam plate forwardly and downwardly about the pivotal connection between the cam plate and the link 35.

Assuming the clutch to be in operation with the foot treadle depressed as shown in Figs. 4 and 5, upon releasing the treadle, the bell crank lever is rocked forwardly, and the cam plate 30 is moved forwardly by the link or bar 35 which connects these members. The leading part of the cam 31 on the cam plate is thereby arranged in line with the groove 32 in the coupling pin 22 and as soon as the pin strikes the cam surface it rides upon it and is retracted from engagement with the driving pulley. As soon as the coupling pin 22 strikes the cam 31, the friction between these members causes the cam plate 30 to be driven upwardly against the top of the pocket 29 against the resistance of the cam plate spring 42.

This position of the clutch with the cam plate 30 driven up against the top of its pocket and the coupling pin partially withdrawn is illustrated in Figs. 6 and 7. As soon as the coupling pin is withdrawn far enough to be released from driving engagement with the hub of the driving pulley, the rotating movement of the driven shaft and the coupling pin stops and at the same time the driving contact between the coupling pin and the cam which holds the cam plate 30 against the top of its pocket ceases. The cam plate return spring thereupon comes into action and forces the cam plate 30 to rotate about its pivotal connection with the bar 35. This secondary movement of the cam plate causes its cam 31 to ride along the groove 32 in the coupling pin 22 and retracts the coupling pin still further from the hub of the driving pulley. It is therefore apparent that by the provision of this means for providing a secondary retraction of the coupling pin through a reacting motion of the cam plate that the coupling pin is withdrawn sufficiently far to provide a definite clearance between it and the hub of the driving wheel and that when the clutch is in neutral as shown in Figs. 1–3, there can be no ineffectual contact between the coupling pin and the wear pins 25 in the hub of the driving wheel which results in a disagreeable noise as well as wear between these parts.

It will also be observed that this result is obtained through the use of a single spring which is arranged to cooperate with the pivotal connection for the cam plate in causing this reaction of the cam plate.

As a whole this invention is extremely simple considering the function which it performs, it operates reliably to establish or break the driving connection between the machine and the source of power, it is not subject to unnecessary wear and noise and will not get out of order under severe and constant use.

I claim as my invention:

1. A clutch including a driving member, a driven member, a coupling member rotatable with said driven member and movable into coupling relation with said driving member and retractable therefrom, a cam member arranged adjacent said coupling member, stop means arranged at one side of said cam member and a spring reacting against the opposite side of said cam member, said spring urging said cam member into engagement with said coupling member to retract said coupling member and said spring cooperating with said stop means to continue the retraction of said coupling member after the driving connection between said coupling and driving members has been broken.

2. A clutch including a driving member, a driven member, a coupling member rotatable with said driven member and movable into coupling relation with said driving member and retractable therefrom, a loosely guided cam plate movable toward and from said coupling member and having a cam face adapted to engage and retract said coupling member, a stop arranged at one side of said cam plate and limiting its movement toward said coupling member and a spring reacting against the opposite side of said cam plate, said spring urging said cam plate toward said coupling member and cooperating with said stop to continue the retraction of said coupling member after the driving connection between said driving and coupling members has been broken and thereby provide a clearance between said coupling member and said driving member.

3. A clutch including a driving member, a driven member, a coupling member rotatable with said driven member and movable into coupling relation with said driving member and retractable therefrom, a loosely guided cam plate movable toward and from said coupling member and having a cam face at one end adapted to engage and retract said coupling member, a stop arranged at one side of the longitudinal center line of movement of said cam plate toward and from said coupling member and limiting the movement of that side of said cam plate toward said coupling member, and a spring reacting against the opposite side of said cam plate and urging said cam plate toward said coupling member, said cam plate being moved against the resistance of said spring during the uncoupling movement of said coupling member and said spring reacting and cooperating with said stop to move said cam plate to further retract said coupling member upon the completion of said uncoupling movement and thereby provide a clearance between said coupling member and said driving member when said clutch is in neutral.

4. A clutch including a driving member, a driven member, a coupling member rotatable with said driven member and movable into coupling relation with said driving member and retractable therefrom, a cam plate movable toward and from said coupling member and having a cam face at one end adapted to engage and retract said coupling member, a stop arranged at one side of the longitudinal center line of movement of said cam plate toward and from said coupling member and limiting the movement of that side of the cam plate toward said coupling member and a spring reacting against the opposite side of said cam plate and urging said cam plate toward said coupling member, said cam plate being moved laterally against the resistance of said spring during the uncoupling movement of said coupling member by the frictional contact between said coupling member and said cam face, and said spring reacting after the completion of said uncoupling movement to cooperate with said stop and effect a reverse lateral movement of said cam plate and move said cam face along said coupling member and effect a further retraction of said coupling member thereby to provide a clearance between said coupling member and said driving member when said clutch is in neutral.

5. A clutch including a driving member, a driven member, a coupling member rotatable with said driven member and movable into coupling relation with said driving member and retractable therefrom, said coupling member being provided with a shoulder, means yieldingly tending to hold said coupling member in engagement with said driving member, an open ended casing arranged adjacent said coupling member, a cam plate arranged in said casing and movable toward and from said coupling member, said cam plate having a cam face at its front end adapted to engage said shoulder and retract said coupling member, a stop arranged at one side of the longitudinal center line of movement of said cam plate toward and from said coupling member and limiting the movement of that side of the cam plate toward and from said coupling member and a spring reacting against the opposite rear side of said cam plate and forming the means for moving said cam plate toward said coupling member, said cam plate being moved laterally against the resistance of said spring during the uncoupling movement of said coupling member by the frictional contact between said coupling member and said cam face, and said spring reacting after the completion of said uncoupling movement to cooperate with said stop and effect a reverse lateral movement of said cam plate and move said cam face along said shoulder and effect a further retraction of said coupling member and thereby provide a clearance between said coupling member and said driving member when said clutch is in neutral.

6. A clutch including a driving member, a driven member, a coupling member rotatable with said driven member and movable into coupling relation with said driving member and retractable therefrom, said coupling member being provided with a shoulder, means yieldingly tending to hold said coupling member in engagement with said driving member, an open ended casing arranged adjacent said coupling member, a cam plate arranged in said casing and movable toward and from said coupling member, said cam plate having a cam face at its front end adapted to engage said shoulder and retract said coupling member, a pin provided at one side of the longitudinal center line of movement of said cam plate toward and from said coupling member, and said pin penetrating an opening provided in said casing and forming a stop for limiting the movement of that side of the cam plate toward and from said coupling member, and a spring reacting against the opposite rear side of said cam plate and forming the means for moving said cam plate toward said coupling member, said cam plate being moved laterally against the resistance of said spring during the uncoupling movement of said coupling member by the frictional contact between said coupling member and said cam face and said spring reacting after the completion of said uncoupling movement to cooperate with said stop pin and effect a reverse lateral movement of said cam plate and move said cam face along said shoulder and effect a further retraction of said coupling member and thereby provide a clearance between said coupling member and said driving member when said clutch is in neutral.

7. A structure as set forth in claim 1 wherein means are connected to said stop means for moving said cam member away from said coupling member.

8. A structure as set forth in claim 6 wherein means are connected to said stop pin for moving said cam plate away from said coupling member to permit said coupling member to move into coupling relation with said driving member.

9. A structure as set forth in claim 6 wherein said spring is interposed between the rear end of said cam plate and said casing and means are provided for adjusting the tension of said spring and removing said spring rearwardly through said casing.

In testimony whereof I hereby affix my signature.

PAUL R. HAHNEMANN.